(12) United States Patent
Debout et al.

(10) Patent No.: US 12,324,531 B2
(45) Date of Patent: Jun. 10, 2025

(54) CONTAINER WITH EFFERVESCENT ACTION

(71) Applicant: ARC FRANCE, Arques (FR)

(72) Inventors: Emilie Debout, Arques (FR); Ludovic Marquant, Arques (FR); Christophe Desgardin, Arques (FR); Yvan Garnier, Arques (FR); Sébastien Donze, Arques (FR)

(73) Assignee: ARC FRANCE, Arques (FR)

( * ) Notice: Subject to any disclaimer, the term of this patent is extended or adjusted under 35 U.S.C. 154(b) by 947 days.

(21) Appl. No.: 17/286,197

(22) PCT Filed: Oct. 17, 2019

(86) PCT No.: PCT/EP2019/078293
§ 371 (c)(1),
(2) Date: Apr. 16, 2021

(87) PCT Pub. No.: WO2020/079193
PCT Pub. Date: Apr. 23, 2020

(65) Prior Publication Data
US 2021/0345800 A1    Nov. 11, 2021

(30) Foreign Application Priority Data
Oct. 19, 2018 (FR) ...................... 1859699

(51) Int. Cl.
*A47G 19/22* (2006.01)
*C03C 17/32* (2006.01)

(52) U.S. Cl.
CPC .......... *A47G 19/2233* (2013.01); *C03C 17/32* (2013.01); *C03C 2217/76* (2013.01); *Y10T 428/1321* (2015.01); *Y10T 428/1352* (2015.01)

(58) Field of Classification Search
CPC ............... A47G 19/2233; C03C 17/32; C03C 2217/76; Y10T 428/1321; Y10T 428/1352
See application file for complete search history.

(56) References Cited

U.S. PATENT DOCUMENTS

| 2008/0290102 A1 | 11/2008 | Mangano |
| 2009/0226648 A1 | 9/2009 | Wild et al. |
| 2010/0104697 A1 | 4/2010 | Kriegel et al. |

(Continued)

FOREIGN PATENT DOCUMENTS

| CN | 101310651 A | 11/2008 |
| DE | 102006048997 B3 | 6/2008 |

(Continued)

OTHER PUBLICATIONS

Machine Translation of EP2823736A1; 2015 (Year: 2015).*

(Continued)

*Primary Examiner* — James C Yager
(74) *Attorney, Agent, or Firm* — Volpe Koenig

(57) ABSTRACT

Carbonated beverage container (1), particularly a glass, comprising a sealed wall made of at least one structural material defining an internal surface intended to receive the beverage, said internal surface comprising an area provided with a discontinuous hydrophobic coating (7) comprising a polymerized siloxane, a plurality of recesses (8) being provided in the hydrophobic coating (7), said recesses (8) not passing through the sealed wall.

15 Claims, 3 Drawing Sheets

(56) References Cited

U.S. PATENT DOCUMENTS

| | | |
|---|---|---|
| 2010/0143602 A1 | 6/2010 | Heft |
| 2014/0151370 A1 | 6/2014 | Chang et al. |
| 2015/0217933 A1 | 8/2015 | Price et al. |

FOREIGN PATENT DOCUMENTS

| | | |
|---|---|---|
| EP | 0703743 B1 | 5/1996 |
| EP | 0753468 A1 | 1/1997 |
| EP | 2823736 A1 | 1/2015 |
| FR | 2531891 A1 | 2/1984 |
| FR | 3008295 A1 | 1/2015 |
| FR | 3065360 A1 | 10/2018 |
| JP | 10440859 U | 4/1992 |
| JP | 2003061804 A | 3/2003 |
| RU | 2657265 C2 | 6/2018 |
| WO | 2010048488 A1 | 4/2010 |

OTHER PUBLICATIONS

Liger-Belair, G. "The physics behind the fizz in champagne and sparkling wines" European Physical Journal: Special Topics 201, 1-88, 2012.

Liger-Belair, G. "La physique des bulles de champagne" Annales de Physique (Paris) 27 (4), 1-106, 2002.

Liger-Belair, G.; Conreux, A.; Villaume, S.; Cilindre, C. "Monitoring the losses of dissolved carbon dioxide from laser-etched champagne glasses" Food Research International, 54, 516-522, 2013.

Liger-Belair, G.; Voisin, C.; Jeandet, P. "Modeling non-classical heterogeneous bubble nucleation from cellulose fibers: Application to bubbling in carbonated beverages" Journal of Physical Chemistry B 109, 14573-14580, 2005.

Liger-Belair, G.; Parmentier, M.; Jeandet, P. "Modeling the kinetics of bubble nucleation in champagne and carbonated beverages" Journal of Physical Chemistry B 110, 21145-21151, 2006.

Liger-Belair, G. "How many bubbles in your glass of bubbly?" Journal of Physical Chemistry B 118, 3156-3163, 2014.

Liger-Belair, G.; Bourget, M.; Villaume, S.; Jeandet, P.; Pron, H.; Polidori, G. "On the losses of dissolved CO2 during champagne serving" Journal of Agricultural and Food Chemistry 58, 8768-8775, 2010.

\* cited by examiner

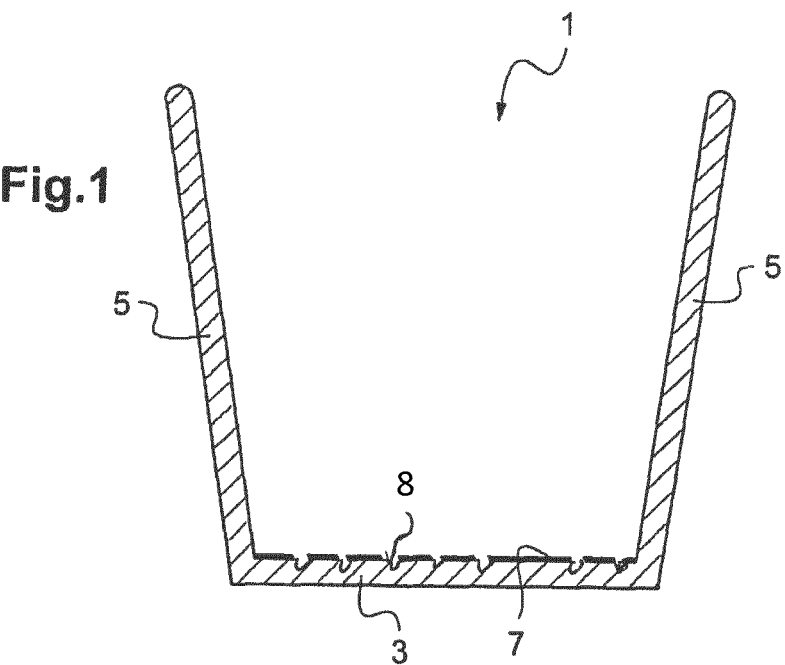
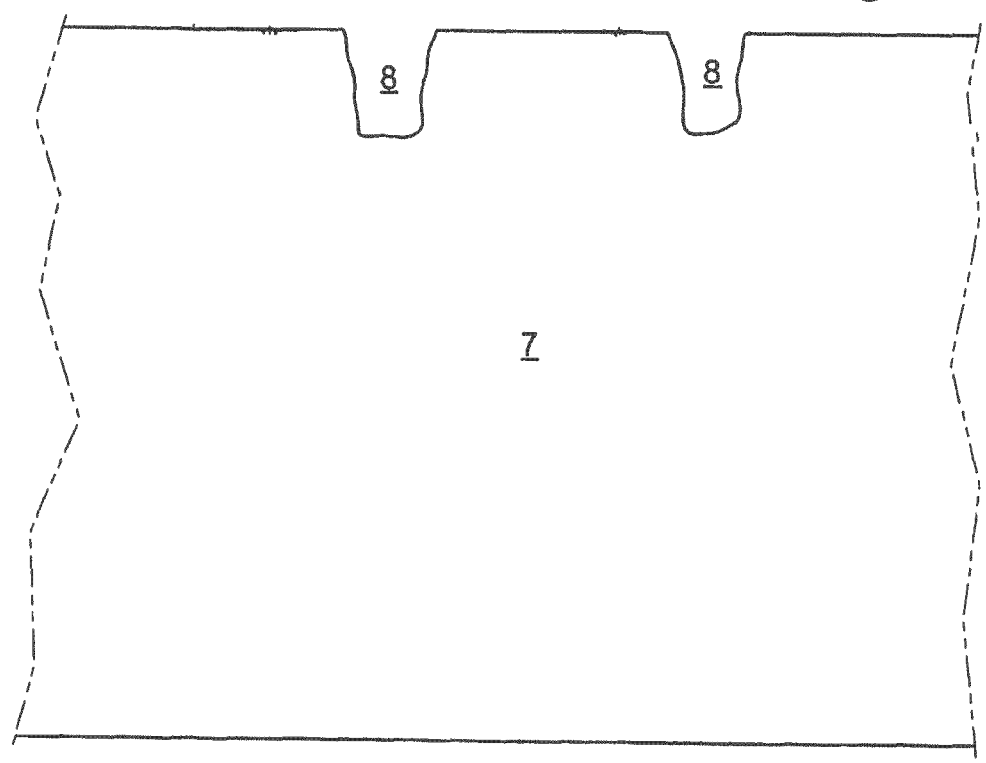

CONTAINER WITH EFFERVESCENT ACTION

TECHNICAL FIELD

The invention relates to the field of vessels for a liquid, and more particularly to glassware articles.

BACKGROUND

During the manufacture of beverage vessels such as glass cups, the surfaces created are generally made as smooth as possible, in particular to procure good transparency and for aesthetic reasons.

Serving a fizzy beverage in a vessel generates effervescence, or bubbling phenomena, and the accumulation of foam on the surface. When serving beer or sparkling wine, for example, effervescence should ideally be generated and maintained. The zones of bubble genesis in a glass are known as nucleation sites.

It has been found that the presence of irregularities in the surfaces of a vessel in contact with a fizzy beverage promotes the formation of bubbles from the gas dissolved in said fizzy beverage. In order to promote bubbling, inside surfaces with a rough face were thus created in containers. When filling the container with a carbon dioxide-infused liquid such as a fizzy beverage, crevices in the internal surface trap air pockets. The interfaces between the liquid and the air pockets improve the gas exchanges. The crevices thus form nucleation zones.

The European patent document EP 0 703 743 describes a method for applying material to a surface to create nucleation sites and improve bubbling. A browning of the bottom of the glass was sometimes observed. The patent application FR 2 531 891 describes a method for removing material which promotes the appearance of gas-releasing zones. Application examples are provided in the international patent application WO 2010/048488.

The French patent document FR 3 008 295 proposes the creation of nucleation sites inside a beverage vessel by way of surface irregularities in a selected area of the vessel on which a hydrophobic layer is then deposited on the selected area.

The French patent application No. FR 1753464 will be published on 21 Oct. 2018 after the date of filing hereof.

The Applicant has identified the need to further improve the quality of the bubbling in order to satisfy larger markets for beers of the type with a low alcohol content and/or low dissolved carbon dioxide levels. The quality of the bubbling encompasses the consistency of the bubbling and thus the reproducibility of the vessel's manufacturing process. A facilitated production process has been sought.

Pr. Liger-Belair and his team at UMR CNRS 7331—University of Reims Champagne—Ardenne have published the following works regarding effervescence:

Liger-Belair, G. "The physics behind the fizz in champagne and sparkling wines" European Physical Journal: Special Topics 201, 1-88, 2012.

Liger-Belair, G. "La physique des bulles de champagne" Annales de Physique (Paris) 27 (4), 1-106, 2002.

Liger-Belair, G.; Conreux, A.; Villaume, S.; Cilindre, C. "Monitoring the losses of dissolved carbon dioxide from laser-etched champagne glasses" Food Research International, 54, 516-522, 2013.

Liger-Belair, G.; Voisin, C.; Jeandet, P. "Modeling non-classical heterogeneous bubble nucleation from cellulose fibers: Application to bubbling in carbonated beverages" Journal of Physical Chemistry B 109, 14573-14580, 2005.

Liger-Belair, G.; Parmentier, M.; Jeandet, P. "Modeling the kinetics of bubble nucleation in champagne and carbonated beverages" Journal of Physical Chemistry B 110, 21145-21151, 2006.

Liger-Belair, G. "How many bubbles in your glass of bubbly?" Journal of Physical Chemistry B 118, 3156-3163, 2014.

Liger-Belair, G.; Bourget, M.; Villaume, S.; Jeandet, P.; Pron, H.; Polidori, G. "On the losses of dissolved CO2 during champagne serving" Journal of Agricultural and Food Chemistry 58, 8768-8775, 2010.

It is desirable to have a beer consumption vessel that ensures satisfactory bubble release for a large number of beer types that can be contained therein, and that is stable during the uses made of the vessel, whether the vessel is dry or wet, in particular when coming out of a glass-washer or when being filled a second time, producing equivalent bubbling, and the manufacture whereof is robust and can be reproduced to guarantee the aforementioned qualities of the vessel with low variability and low sensitivity to small variations during production.

The invention improves the situation, in particular as regards the Applicant's last two patents cited hereinabove.

SUMMARY

The Applicant proposes a fizzy beverage container, in particular a glass, comprising an impervious wall made of at least one structural material defining an internal surface intended to receive the beverage. Said internal surface comprises an area provided with a hydrophobic coating comprising a polymerized siloxane. A plurality of recesses are made in said hydrophobic coating. Said recesses do not pass through the impervious wall.

Said recesses can penetrate or not penetrate the hydrophobic coating from end to end, as a function of the thickness of said hydrophobic coating.

The recesses form nucleation sites. The ability to withstand washing is excellent, in particular for more than 500 cycles in a glass-washer, with bubbling being preserved on a dry or wet vessel. Bubbles are generated at the nucleation sites and released. The bubble retention phenomenon observed by the Applicant in certain containers of the prior art is prevented. The hydrophobic coating rests on the structural material. The vessel is free of enamel in the bubbling zone.

The removal technique implemented prevents the glass from heating up, thus resulting in a fast and energy-efficient production process.

Etching after deposition of the hydrophobic coating, corresponding in terms of structure to perforations that can penetrate or not penetrate the hydrophobic coating from end to end, allows the hydrophobic coating thickness tolerance to be increased, while remaining neutral during the etching step, and procures perforations with sharper edges, in other words with smaller connecting radii between the top surface of the hydrophobic coating and the side surface of the perforation. This is conducive to bubbling. The industrial manufacturing process is facilitated. The hydrophobic coating can be deposited in a more cost-effective manner.

Moreover, plasma techniques are heavy industrial applications. These can be avoided in this case.

In one embodiment, the hydrophobic coating covers from 10 to 75% of the area at the surface.

In one embodiment, the hydrophobic coating forms bumps in the area.

In one embodiment, the hydrophobic coating forms zones that are spaced apart from one another. The zones can be approximately circular in shape.

In one embodiment, the hydrophobic coating has a thickness that varies from more than 0 to 250 µm from one zone to another zone of said coating. The hydrophobic coating can be formed in a single layer. Preferably, the thickness varies from more than 0 to 100 µm.

In one embodiment, the hydrophobic coating has at least one first part with a thickness comprised between 20 and 100 µm, and at least one second part with a thickness comprised between 0.2 and 5 µm.

In one embodiment, the polysiloxane is provided with a methyl radical, and is preferably a polymethylsiloxane, in particular a SILRES® HK46.

In one embodiment, the polysiloxane is provided with a methyl radical and with a phenyl radical, and is preferably a polymethylphenylsiloxane, in particular a SILBIONE® 76405.

In one embodiment, the hydrophobic coating has a water contact angle greater than or equal to 60°, preferably greater than or equal to 100°. Hydrophobicity is considered herein in the broadest sense to apply for an angle of 60° or more.

In one embodiment, the hydrophobic coating is suitable for contact with foods.

In one embodiment, the hydrophobic coating has a substantially planar external surface, outside of the recesses.

In one embodiment, the recesses have an inter-recess distance comprised between 150 and 550 µm. Melting of the structural material is prevented.

In one embodiment, the recesses have a width comprised between 50 and 350 µm. Said width is a diameter in the case of circular recesses.

In one embodiment, said recesses are holes disposed in a regular pattern. The holes are blind.

The invention further relates to a method for creating nucleation sites inside a beverage vessel and for promoting the formation of bubbles upon contact with a fizzy beverage, wherein an area is provided with at least one discontinuous hydrophobic coating comprising a polymerized siloxane, the vessel comprising an impervious wall made of at least one structural material defining an internal surface intended to receive a beverage, said internal surface comprising said area, and recesses are made in the hydrophobic coating, said recesses not passing through the impervious wall and preferably penetrating the hydrophobic coating from end to end.

In one embodiment, said hydrophobic coating is deposited by pad printing and then undergoes heat treatment.

In one embodiment, said recesses are made by laser shots having a frequency comprised between 1 and 20 kHz, preferably between 5 and 15 kHz, a power comprised between 20 and 150 W, preferably between 60 and 120 W, and a duration comprised between 0.1 and 3 s, preferably between 0.5 and 3 s.

In one embodiment, said recesses are made by laser shots having a frequency comprised between 5 and 15 kHz.

In one embodiment, said recesses are made by laser shots having a power comprised between 60 and 120 W.

In one embodiment, said recesses are made by laser shots having a duration comprised between 0.5 and 3 s.

In one embodiment, the vessel is made of soda-lime glass.

In one embodiment, the vessel is made of crystal. The crystal comprises a sum of PbO, BaO, K2O and ZnO greater than or equal to 10 wt %, has a density d>2.45 and a refractive index nd≥1.52.

The vessel can further comprise a glass body. The transparency makes it possible to view the appearance and the path of the bubbles from the nucleation site to the surface of the beverage.

BRIEF DESCRIPTION OF THE DRAWINGS

Other features, details and advantages of the invention will become apparent upon reading the detailed description provided hereinbelow, and from the accompanying drawings, in which:

FIG. 1 is a sectional view of a container,

FIG. 2 is a detailed view of that shown in FIG. 1,

DETAILED DESCRIPTION OF THE PREFERRED EMBODIMENTS

Figure 5:
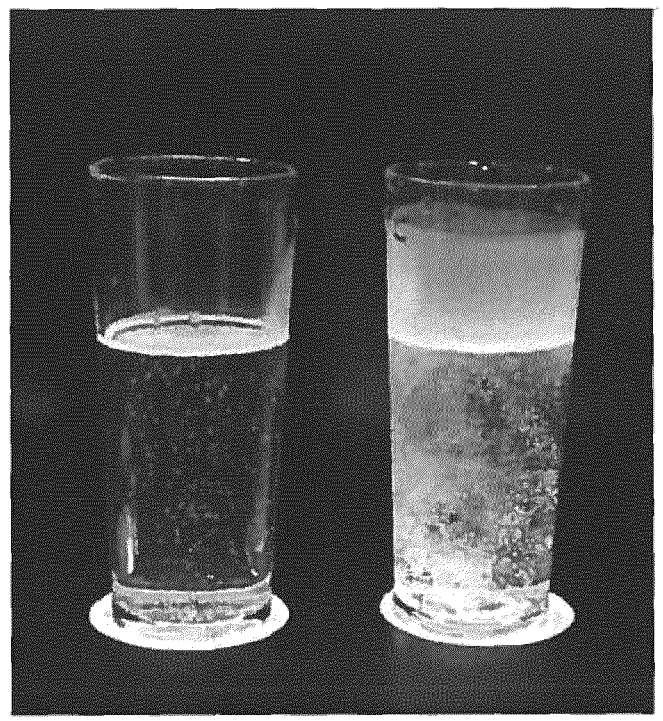
FIG. 5 is a photograph comparing one embodiment of the invention with a non-coated glass.

The drawings and the description that follow essentially contain elements of a definite nature. They can thus serve not only to assist with the understanding of the present invention, but also to contribute to the definition thereof, where appropriate.

In a liquid food, carbon dioxide (CO2) dissolved in the liquid phase is the carrier gas for the effervescence phenomenon. The frequency with which bubbles are emitted during consumption, the enlargement of the bubbles in the container and the number of bubbles likely to form are related to a certain number of physical-chemical parameters of the liquid phase and of the container in which it is consumed.

When a gas is brought into contact with a liquid, a part of this gas dissolves in the liquid. Various factors influence the solubility of the gas in the liquid, in particular the temperature and pressure. At equilibrium, there is a proportionality between the concentration in the liquid phase of a chemical species i, denoted ci, and the partial pressure thereof in the gaseous phase Pi. Henry's law is written as follows:

$$ci = k\text{H } Pi \quad [1]$$

The proportionality constant kH is known as the Henry's law constant. It is highly dependent on the gas and on the liquid being considered, as well as on the temperature.

At normal atmospheric pressure Po≈1 bar, taking into account the solubility of CO2 in a beer at 4° C. which is given by kH≈2.6 g/L/bar, said beer is liable to dissolve about 2.6 g/L of CO2.

When a chemical substance i is in equilibrium on either side of a gas/liquid interface, the concentration thereof in the liquid satisfies Henry's Law. The liquid is thus said to be saturated with this substance. In this case, saturation is understood to mean equilibrium.

When the concentration CL of a chemical substance i in a liquid is greater than that provided for by Henry's law, the liquid is supersaturated with this substance. In order to quantify this out-of-equilibrium situation, the supersaturation ratio Si is defined as being the relative excess of the concentration, in a liquid, of a substance i with respect to the reference concentration, denoted c0 (chosen as the equilibrium concentration of this substance under a partial pressure equal to the pressure prevailing in the liquid PL). The supersaturation ratio Si is thus defined in the following form:

$$Si = (ci - c0)/c0 \quad [2]$$

When a liquid is supersaturated with a chemical substance, $Si>0$. The liquid evacuates part of its content of this chemical substance in order to find a new state of equilibrium that satisfies Henry's law.

Under conditions of consumption, in a container, the pressure in the liquid is almost identical to the ambient pressure. Given the low liquid height, which does not exceed 20 to 25 cm, the effect of the hydrostatic overpressure at the bottom of the container is negligible relative to the atmospheric pressure. At a temperature of 4° C., the equilibrium concentration can thus be deduced as being equal to:

$$c0 = kHPL \approx kHP0 \approx 2.6 \text{ g/L} \quad [3]$$

Not all beers have the same concentration of dissolved CO2. Some are lightly carbonated at 3-4 g/L, whereas others are heavily carbonated at up to 7-8 g/L. The respective supersaturation ratios thereof relative to the dissolved CO2 thus will not be the same. In the case of an average beer, carbonated at about 5 g/L, the supersaturation ratio thereof (at 4° C.) is determined by applying the equation [2]:

$$SCO2 = (ci - c0)/c0 \approx (5 - 2.6)/2.6 \approx 0.9 \quad [4]$$

For comparison (still at 4° C.), highly carbonated waters (such as Badoit Rouge) have supersaturation ratios in the order of 1.3, whereas Champagne wines (when still young) have much higher ratios, in the order of 3.4. In general, the higher the supersaturation ratio of a liquid carbonated with dissolved CO2, the more intense the resulting kinetics of the dissolved carbon dioxide release in order to restore Henry's equilibrium. However, it has been observed that the supersaturation of a liquid with dissolved gas is not necessarily synonymous with the formation of bubbles and thus with effervescence.

More specifically, at beer supersaturation values, the formation of bubbles requires the presence of gas pockets in the medium, the radius of curvature rC whereof exceeds a so-called critical value defined as follows:

$$rC = 2\gamma/PoS \quad [5]$$

where $\gamma$ is the surface tension of the liquid, Po is the ambient pressure and S is the CO2 supersaturation ratio of the liquid phase.

At the normal atmospheric pressure of 1 bar and at 4° C., for a beer with a typical surface tension of 45 mN/m and a supersaturation ratio of about 0.9, the above equation gives a critical radius of about 1 μm, below which bubble formation does not occur.

To make CO2 bubbles appear and grow bigger in a beer, the interior of the medium contains micro-bubbles of gas, the radii whereof are greater than this critical radius in the order of 1 μm. This is referred to as non-conventional, heterogeneous nucleation (as opposed to so-called conventional nucleations which concern the spontaneous formation, ex nihilo, of bubbles in a highly supersaturated liquid). Conventional nucleations require very high dissolved gas supersaturation ratios (>100), which are incompatible with fizzy beverages.

The question then arises as to the origin of the gas germs which are the catalysts of effervescence in a container.

The Applicant has observed, in situ, the manner in which appear the bubbles in beers served in smooth glasses that had thus not undergone any specific treatment. In the vast majority of cases, air pockets trapped in particles adsorbed at the surface of the glass act as the nucleation sites. The radius of these pockets of gas trapped at the core of the particles (usually cellulose fibers) generally exceeds the critical radius required to allow for the diffusion of dissolved CO2 and thus the repetitive production of bubbles in the glass.

The critical nucleation radius takes into account the concentration of dissolved CO2 in the beer, see equations [4] and [5]. However, after being served, said concentration is no longer the same as the initial concentration. Service is a critical step. More specifically, the action of pouring into the container generates significant turbulence which accelerates the release of the dissolved carbon dioxide. The colder the beer, the more the dissolved carbon dioxide remains dissolved at the time of serving. More specifically, the colder the beer, the more viscous it becomes. Yet, the lower the viscosity of the beer, the faster the rate of diffusion of the dissolved CO2 from the beer. Moreover, the more viscous the beer, the more effectively turbulence occurring during the pouring process is reduced. As a result, the colder the beer is when served, the more the dissolved carbon dioxide is preserved during service.

For St Omer beer, served at 4° C. in a smooth glass, critical radii of 1.02±0.02 μm are observed.

For Carlsberg beer, served at 4° C. in a smooth glass, a critical radius of 1.05±0.02 μm is observed.

Furthermore, it has been shown that the bubble flow, i.e. the number of bubbles per second, is proportional to the square of the temperature and to the concentration of dissolved CO2 in the liquid, and is inversely proportional to the dynamic viscosity of the liquid (in kg/m/s).

For a container, according to one embodiment, filled with beer, a height of foam was seen to be substantially preserved, regardless of whether the container was dry at ambient temperature or wet at the temperature at which it leaves the glass-washer. Non-released bubbling is very low.

Figure 3:
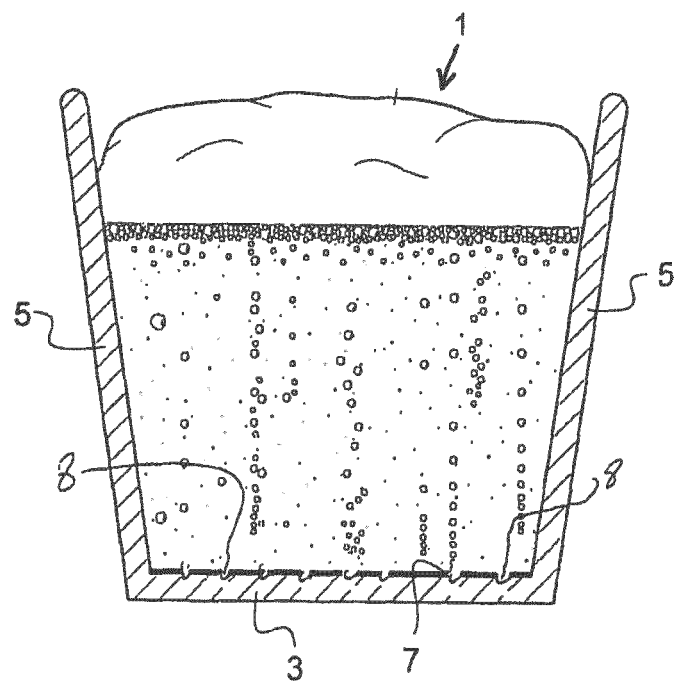
FIG. 3 shows a view that is similar to that in FIG. 1 in the presence of a fizzy beverage.

Such a container 1 is shown in the figures. The container 1, in this case, takes the form of a drinking glass. In alternative embodiments, the container 1 takes the form of a beer mug, a champagne flute, or any other container adapted to hold a fizzy beverage. The method described hereinbelow applies to most vessels for fizzy beverages for which control of effervescence is of interest, see FIG. 3.

The container 1, in this case, consists of a substantially planar bottom 3 and a substantially frustoconical side wall 5. The container 1 is, in this case, axisymmetric. In the example described here, the bottom 3 and the wall 5 form a one-piece body. The body has an internal bottom surface and an internal edge surface. The body is impervious. The internal surfaces are intended to be in contact with the beverage when the container 1 is used.

The container 1 can be obtained by manufacturing techniques known per se, for example by pressing, blowing and/or spinning. At the end of such manufacturing techniques, the inside of the container 1 is substantially smooth and uniform. The container 1 is said to be rough.

The rough container 1 is coated. A discontinuous coating is applied to the top surface of the bottom 3 located on the wall 5 side, i.e. the internal bottom surface. The discontinuous coating applied to the top surface of the bottom 3 located on the wall 5 side is a hydrophobic coating 7.

The hydrophobic coating 7 partially covers the bottom 3. The hydrophobic coating 7 can be disposed in spots spaced apart from one another. The hydrophobic coating 7 can be disposed in bumps spaced apart from one another. The hydrophobic coating covers 10 to 75% of the area at the surface. The wall 5 is rough. More generally, the wall 5 is devoid of any hydrophobic layer.

The hydrophobic coating 7 forms separate zones. The zones are spaced apart from one another.

The hydrophobic coating 7 comprises a polysiloxane. The hydrophobic coating 7 can be made of polysiloxane. The polysiloxane is provided with a methyl radical and with a phenyl radical, preferably a polymethylphenylsiloxane, in particular a SILBIONE® 76405 supplied by ELKEM or a polysiloxane provided with a methyl radical, preferably a polymethylsiloxane, in particular a SILRES® HK46 supplied by WACKER. The polysiloxane is applied to the top surface of the bottom 3. The application can be carried out by spraying, in particular with an air gun or by pad printing. Drying is then carried out, in particular in air. The temperature can be below 300° C. The duration can be comprised between 5 minutes and 5 hours. Drying can be carried out by exposing the polysiloxane to an infrared light.

The hydrophobic coating 7 has a thickness comprised between 0.2 and 250 µm. The hydrophobic coating 7 can have a first part with a thickness comprised between 0.2 and 5 µm and a second part with a thickness comprised between 20 and 100 µm. Below 0.2 µm, the hydrophobic coating 7 is difficult to observe and can be present. The hydrophobic coating 7 has a water contact angle of greater than or equal to 60°. The hydrophobic coating 7 is suitable for contact with foods.

The hydrophobic coating 7 can be tinted, especially the same color as the container. For a white—transparent glass container, the hydrophobic coating 7 is also transparent or at least translucent.

The coated container 1 is etched. The etching is made in the zone of the hydrophobic coating. The etching penetrates the hydrophobic coating from end to end, in particular when the hydrophobic coating is less than 30 µm thick. The etching reaches the mass of the material of the body, which is usually made of glass or stoneware. The etching is carried out according to predetermined patterns to obtain an even distribution of the nucleation sites. The etching is carried out using a laser beam, in particular in one or more passes.

The etching can penetrate the glass of the bottom 3. The etching can be made in the glass of the bottom 3 outside the zone of the hydrophobic coating. Recesses outside the zone of the hydrophobic coating can thus be formed.

The etching forms concavities or recesses 8 taking the form of dots or grooves. The depth of the recesses 8 can be comprised between 20 and 30 µm. The width of the recesses 8 can be comprised between 50 and 350 µm. The minimum distance between two recesses 8 can be comprised between 150 and 550 µm.

The laser beam can cover the area to be etched at a speed comprised between 3 and 8 m/s. The frequency of the laser beam can be comprised between 1 and 20 kHz, preferably between 5 and 15 kHz. The power output of the laser beam can be comprised between 20 and 150 W, preferably between 60 and 120 W. The laser can be of the CO2 type. The wavelength of the laser can be comprised between 300 and 500 nm or between 10 and 11 µm. The marking time can be comprised between 0.1 ms and 3 s, preferably between 0.5 and 1 s.

The container 1 can be coated and etched on the fly on a production line without intermediate storage. A manual or automated station for depositing the layer forming the hydrophobic coating 7, a continuous dryer, a continuous curing oven and an etching laser disposed in a cooling zone downstream of the continuous oven can be provided. The production time is thus unaffected by the etching. In other words, etching can be carried out on containers still at a temperature above ambient temperature.

Figure 4:
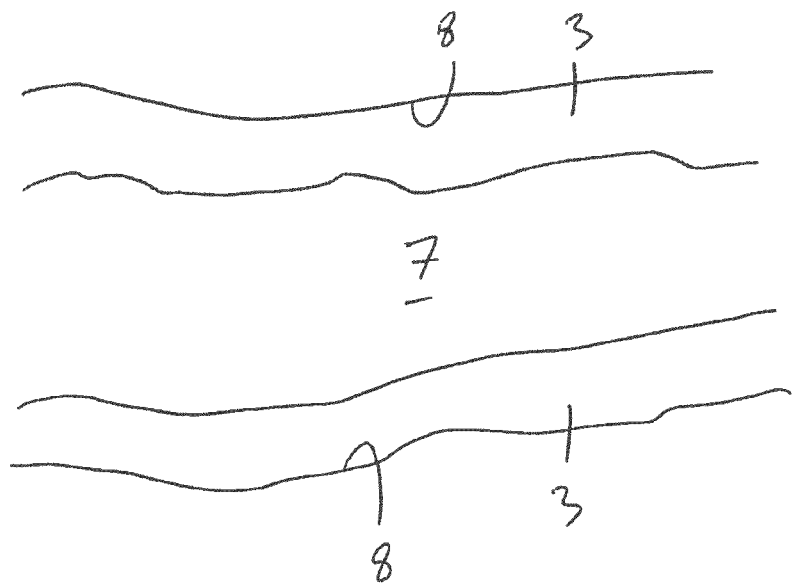
FIG. 4 is an overhead view with high magnification of the internal surface of the bottom of the container.

FIG. 4 shows an overhead view of an enlargement of a glass bottom. The enlargement is equal to about 100. The recesses 8 form nucleation sites inside the vessel, in this case on the internal surface of the bottom 3. The nucleation sites promote the formation of bubbles upon contact with a carbon dioxide- and/or nitrogen-infused beverage. The geometry of the hydrophobic coating 7, outside the recesses 8, is preserved.

For a glass thus treated, the bubbling of the beer in the dry state and the bubbling of the beer in the hot and wet state are almost identical. The invention applies in particular to vessels made of soda-lime glass or crystal, in particular made of crystal without any intentional contribution of Pb. Such a crystal generally has a Pb content of less than 0.5 wt %, preferably less than 10 ppm.

FIG. 5 compares an ordinary beer glass on the left with a glass according to the invention on the right. The ordinary beer glass has an internal surface in contact with the beer, made of glass. The conditions regarding the temperature, humidity and the length of time the beer is kept in the glass are identical. After a few minutes, the ordinary beer glass no longer contains foam and bubbling is very sparse; the glass according to the invention contains a foam that is several centimeters high and dense bubbling.

The invention is not limited to the example methods and vessels described hereinabove, by way of example, but encompasses all alternative embodiments that could be considered by a person skilled in the art within the scope of the claims hereinbelow.

The invention claimed is:

1. A fizzy beverage container comprising an impervious wall made of at least one structural material defining an internal surface configured to receive a beverage, said internal surface comprising an area provided with a discontinuous hydrophobic coating comprising a polymerized siloxane, a plurality of recesses being made in said hydrophobic coating, said recesses not passing through the impervious wall and at least one recess passing entirely through said hydrophobic coating to thereby define nucleation sites on the impervious wall.

2. The fizzy beverage container according to claim 1, wherein the hydrophobic coating has a thickness that varies from more than 0 to 250 µm from one zone to another zone of said coating.

3. The fizzy beverage container according to claim 1, wherein the hydrophobic coating has at least one first part with a thickness comprised between 20 and 100 µm and at least one second part with a thickness comprised between 0.2 and 5 µm.

4. The fizzy beverage container according to claim 1, wherein the polysiloxane is provided with a methyl radical or is provided with a methyl radical and a phenyl radical.

5. The fizzy beverage container according to claim 1, wherein the hydrophobic coating has a water contact angle of greater than or equal to 60°.

6. The fizzy beverage container according to claim 1, wherein the hydrophobic coating is suitable for contact with foods and the hydrophobic coating has, outside of the recesses, a substantially planar free surface.

7. The fizzy beverage container according to claim 1, wherein the recesses have an inter-recess distance comprised between 150 and 550 µm and a width comprised between 50 and 350 µm, and said recesses are holes disposed in a regular pattern.

8. Method for creating nucleation sites inside the fizzy beverage container according to claim 1 and for promoting formation of bubbles upon contact with a fizzy beverage, comprising:

providing the area with at least one hydrophobic coating comprising a polymerized siloxane, and thereafter, making said recesses in the at least one hydrophobic coating including the at least one recess passing entirely through said hydrophobic coating to thereby define nucleation sites on the impervious wall.

9. The method according to claim 8, wherein said at least one hydrophobic coating is deposited by pad printing, then undergoes heat treatment.

10. The method according to claim 8, wherein said recesses are made by laser shots having a frequency comprised between 1 and 20 kHz, a power comprised between 20 and 150 W, and a duration comprised between 0.1 and 3 s.

11. The method according to claim 8, wherein said recesses are made by laser shots having a frequency comprised between 5 and 15 kHz, a power comprised between 60 and 120 W, and a duration comprised between 0.5 and 1 s.

12. The fizzy beverage container according to claim 1, wherein the polysiloxane is provided with a polymethylsiloxane, or is provided with a polymethylphenylsiloxane.

13. The fizzy beverage container according to claim 1, wherein the polysiloxane is provided with a polymethylsiloxane.

14. The fizzy beverage container according to claim 1, wherein the hydrophobic coating has a water contact angle of greater than or equal to 100°.

15. The fizzy beverage container according to claim 1, wherein the plurality of recesses are made entirely through said hydrophobic coating to thereby define nucleation sites on the impervious wall.

* * * * *